US 8,167,749 B2

(12) United States Patent
Miyamoto

(10) Patent No.: US 8,167,749 B2
(45) Date of Patent: May 1, 2012

(54) BELT TENSIONER AND BELT EXCHANGING METHOD OF BELT TENSIONER

(75) Inventor: Tomomi Miyamoto, Hiroshima (JP)

(73) Assignee: Mazda Motor Corporation (JP)

(*) Notice: Subject to any disclaimer, the term of this patent is extended or adjusted under 35 U.S.C. 154(b) by 912 days.

(21) Appl. No.: 12/180,590

(22) Filed: Jul. 28, 2008

(65) Prior Publication Data
US 2009/0054185 A1 Feb. 26, 2009

(30) Foreign Application Priority Data
Aug. 23, 2007 (JP) ................... 2007-216595

(51) Int. Cl.
F16H 7/14 (2006.01)
(52) U.S. Cl. ........................................ 474/117
(58) Field of Classification Search .................. 474/101, 474/109, 111, 112, 115, 117–119, 128–130, 474/135, 138
See application file for complete search history.

(56) References Cited

U.S. PATENT DOCUMENTS

| 3,374,686 | A | * | 3/1968 | Brewer | 474/135 |
| 4,500,303 | A | * | 2/1985 | Sermersheim et al. | 474/112 |
| 4,713,045 | A | * | 12/1987 | Kodama et al. | 474/135 |
| 4,764,157 | A | * | 8/1988 | Brandenstein et al. | 474/135 |
| 5,405,297 | A | * | 4/1995 | Gardner et al. | 474/135 |
| 5,462,494 | A | * | 10/1995 | Rogalla | 474/135 |
| 2005/0192144 | A1 | * | 9/2005 | Yokoyama | 474/117 |
| 2005/0282668 | A1 | * | 12/2005 | Ali et al. | 474/101 |
| 2006/0287146 | A1 | * | 12/2006 | McVicar et al. | 474/109 |
| 2009/0298631 | A1 | * | 12/2009 | Jud et al. | 474/135 |
| 2011/0070984 | A1 | * | 3/2011 | Kotzur | 474/133 |

FOREIGN PATENT DOCUMENTS

| JP | 09-177911 | 7/1997 |
| JP | 2006-250286 | 9/2006 |

* cited by examiner

Primary Examiner — William A Rivera
(74) Attorney, Agent, or Firm — Studebaker & Brackett PC; Donald R. Studebaker

(57) ABSTRACT

A tensioner arm comprises a tool-engagement portion for engaging with a tensioner-arm rotation tool, and a jig-holding portion which has a through hole for accepting a tensioner-arm fixation bar jig being inserted thereinto from above at a portion of the tensioner arm extending upward from the base end portion. A bearing case comprises a contact face portion which is provided at a face located below the jig-holding portion of the bearing case so as to accept the bar jig being inserted into the through hole of the tensioner arm, and an engagement stair portion which is provided at the contact face portion so as to engage with the bar jig such that move of the tensioner arm toward the belt by the biasing mechanism is restricted. A belt tensioner which enables an easy belt exchanging even by a single worker without detaching surrounding components of the engine can be provided.

7 Claims, 8 Drawing Sheets

BELT TENSIONER AND BELT EXCHANGING METHOD OF BELT TENSIONER

BACKGROUND OF THE INVENTION

The present invention relates to a belt tensioner which restrains a belt of an engine from loosening and a belt exchanging method of the same.

An engine is equipped with auxiliary components, such as an alternator, a water pump, a compressor of air conditioner. There are provided some axes which extend from the components in parallel to a crankshaft, and pulleys are attached to one ends of the axes. A belt is disposed between each of the pulleys and the crankshaft so that the axes of the components can be rotated (driven) by the crankshaft.

There occurs looseness at the belt on a looseness side while the belt rotates. Accordingly, a belt tensioner is generally provided to restrain this looseness. For example, the belt tensioner comprises a bearing member (fixation member) attached to an end face of an engine body, a tensioner arm, a base end portion of which is supported rotatably at the bearing member via an axis in parallel to an engine output shaft, a pulley supported rotatably at a free end portion of the tensioner arm via an axis in parallel to the engine output shaft, and a biasing mechanism provided between the bearing member and the tensioner arm so as to bias the tensioner arm toward the belt.

In the above-described belt tensioner, it may be required that the pulley of the tensioner belt is provided so as to retreat in a counter biasing direction in order to dispose the belt between the pulleys. Japanese Patent Laid-Open Publication No. 09-177911 discloses a device which may improve a belt attachment work in a vehicle assembling, in which small holes are formed at the bearing member and the tensioner arm respectively, and a stopper pin is inserted into these small holes in a direction in parallel to the above-described axes, thereby keeping the tensioner arm in a position where the tensioner arm retreats toward the counter biasing direction.

Further, Japanese Patent Laid-Open Publication No. 2006-250286 discloses a device in which at a specified face of the tensioner arm on an counter engine-body side are provided plural projections with which a lever-shaped jig engages, and by rotating the lever-shaped jig engaging with the projections in a counter biasing direction, the tensioner arm may be provided so as to retreat toward the counter biasing direction.

According to the device of the former of the above-described patent publications, since many devices and the like are disposed in front of the engine's end face in the assembled vehicle, it may be difficult that the stopper pin is inserted into the above-described holes after the vehicle has been assembled. This is because the stopper pin being inserted might interfere with the above-described devices and the like. Accordingly, it may be required that such devices and the like are detached or the engine itself is disassembled when the belt exchanging is conducted at a regular maintenance or the like. Thus, the belt changing would be troublesome.

According to the device of the latter of the above-described patent publications, since there is provided no mechanism for holding the belt tensioner which has been rotated by the belt exchanging jig, two workers may be necessary for operating the belt exchanging jig and exchanges the belt. Thus, the belt exchanging would not be conducted by a single worker.

SUMMARY OF THE INVENTION

An object of the present invention is to provide a belt tensioner and belt exchanging method of the belt tensioner which enable an easy belt exchanging even by a single worker without detaching surrounding components of the engine.

According to the present invention, there is provided a belt tensioner, comprising a bearing case attached to an end face of an engine body, a tensioner arm, a base end portion of which is supported rotatably at the bearing case via an axis in parallel to an engine output shaft, a pulley supported rotatably at a free end portion of the tensioner arm via an axis in parallel to the engine output shaft, and a biasing mechanism provided between the bearing case and the tensioner arm so as to bias the tensioner arm toward a belt, wherein the tensioner arm comprises a tool-engagement portion for engaging with a tensioner-arm rotation tool, and a jig-holding portion which has a through hole for accepting a tensioner-arm fixation bar jig being inserted thereinto from above at a portion of the tensioner arm extending upward from the base end portion, and the bearing case comprises a contact face portion which is provided at a face located below the jig-holding portion of the bearing case so as to accept the bar jig being inserted into the through hole of the tensioner arm, and an engagement stair portion which is provided at the contact face portion so as to engage with the bar jig such that a move of the tensioner arm toward the belt by the biasing mechanism is restricted.

The belt exchanging work according to the present invention will be conducted as follows. The tensioner-arm fixation bar jig is inserted from above into the through hole formed at the jig-holding portion of the tensioner arm so that it can contact the contact face portion of the tensioner case. The tensioner-arm rotation tool is made engage with the tool-engagement portion of the tensioner arm. Then, the tensioner-arm rotation tool is rotated. Thereby, the bar jig under rotation moves due to its weight so that it can engage with the engagement stair portion of the tensioner case. As a result, even if the tensioner-arm rotation tool has been removed, the move of the tensioner arm toward the belt by the biasing mechanism can be restricted properly. Accordingly, the worker can conduct the belt exchanging work subsequently. Thus, the necessary works for exchanging belt can be done by a single worker.

Further, since the jig-holding portion has the through hole for accepting the tensioner-arm fixation bar jig being inserted thereinto from above, inserting or removing the bar jig can be conducted from above. Thereby, there may be no need to detach the various devices and the like which have been already attached in front of the end face of the engine.

Also, the structure of the belt tensioner itself can be made properly simple with the above-described structure, so the cost of that may be kept low.

According to an embodiment of the present invention, the tensioner-arm rotation tool is a wrench, and the tool-engagement portion of the tensioner arm is a wrench-engagement projection which is provided at the portion of the tensioner arm extending upward from the base end portion so as to project in a direction of a rotational axis of the tensioner arm. Thereby, attaching or detaching the rotation tool can be also conducted from above. Accordingly, operations of the bar jig and the rotation tool can be done continuously.

According to another embodiment of the present invention, the engagement stair portion comprises two stair portions which are located with a specified distance from each other in a rotational direction of the tensioner arm. Thereby, the tensioner arm can be held temporarily with the first engagement stair portion while the wrench is rotated, and in this state the engagement of the wrench can be changed. Accordingly, even if a working space for operating the wrench was narrow, the tensioner arm could be rotated greatly.

According to another embodiment of the present invention, the tensioner-arm rotation tool is a wrench, and the tool-engagement portion of the tensioner arm is a wrench-engagement projection which is provided at the portion of the tensioner arm extending upward from the base end portion so as to project toward a counter engine-body side in a direction of a rotational axis of the tensioner arm, the wrench-engagement projection being provided so as to retreat from a face of the tensioner arm on a counter engine-body side. Thereby, the wrench-engagement projection can be prevented from interfering with other devices and the like in an engine room at the operation of the wrench.

According to another embodiment of the present invention, the tool-engagement portion and the jig-holding portion of the tensioner arm are provided at an upper end portion of the tensioner aim. Thereby, when the tensioner-arm rotation tool is made engage and the tensioner-arm fixation jig is inserted from above, respective distances to the tool-engagement portion and the jig-engagement portion are properly short, so that the operation for engagement and insertion can be easier.

According to another embodiment of the present invention, the engine body is disposed laterally in an engine room of a vehicle, an end face of which is supported at a vehicle body via a mount member, and the belt tensioner is disposed between the end face of the engine body and the mount member. In this case, a space for operating the tensioner arm would become considerably small. Herein, the advantages of the present invention can be properly achieved.

According to another aspect of the present invention, there is provided a belt exchanging method of a belt tensioner which comprising a bearing case attached to an end face of an engine body, a tensioner arm, a base end portion of which is supported rotatably at the bearing case via an axis in parallel to an engine output shaft, a pulley supported rotatably at a free end portion of the tensioner arm via an axis in parallel to the engine output shaft, and a biasing mechanism provided between the bearing case and the tensioner arm so as to bias the tensioner arm toward a belt, the method comprising a step of making a tensioner-arm fixation bar jig come into a through hole of a jig-holding portion which is formed at a portion of the tensioner arm extending upward from a base end portion of the tensioner arm such that a contact face portion provided at a face located below the jig-holding portion of the bearing case accepts the tensioner-arm fixation bar jig being inserted into the through hole, a step of making a tensioner-arm rotation tool engage with a tool-engagement portion which is formed at the tensioner arm, and a step of making the tensioner-arm rotation tool rotate against a biasing force of the biasing mechanism after the above-described steps such that the bar jig engages with an engagement stair portion which is formed at the contact face portion of the bearing case, thereby restricting a move of the tensioner arm toward the belt by the biasing mechanism. This aspect of the present invention provides substantially the same advantages as the above-described invention does.

Other features, aspects, and advantages of the present invention will become apparent from the following description which refers to the accompanying drawings.

DETAILED DESCRIPTION OF THE INVENTION

Hereinafter, a belt tensioner according to a preferred embodiment of the present invention will be described.

Figure 1:
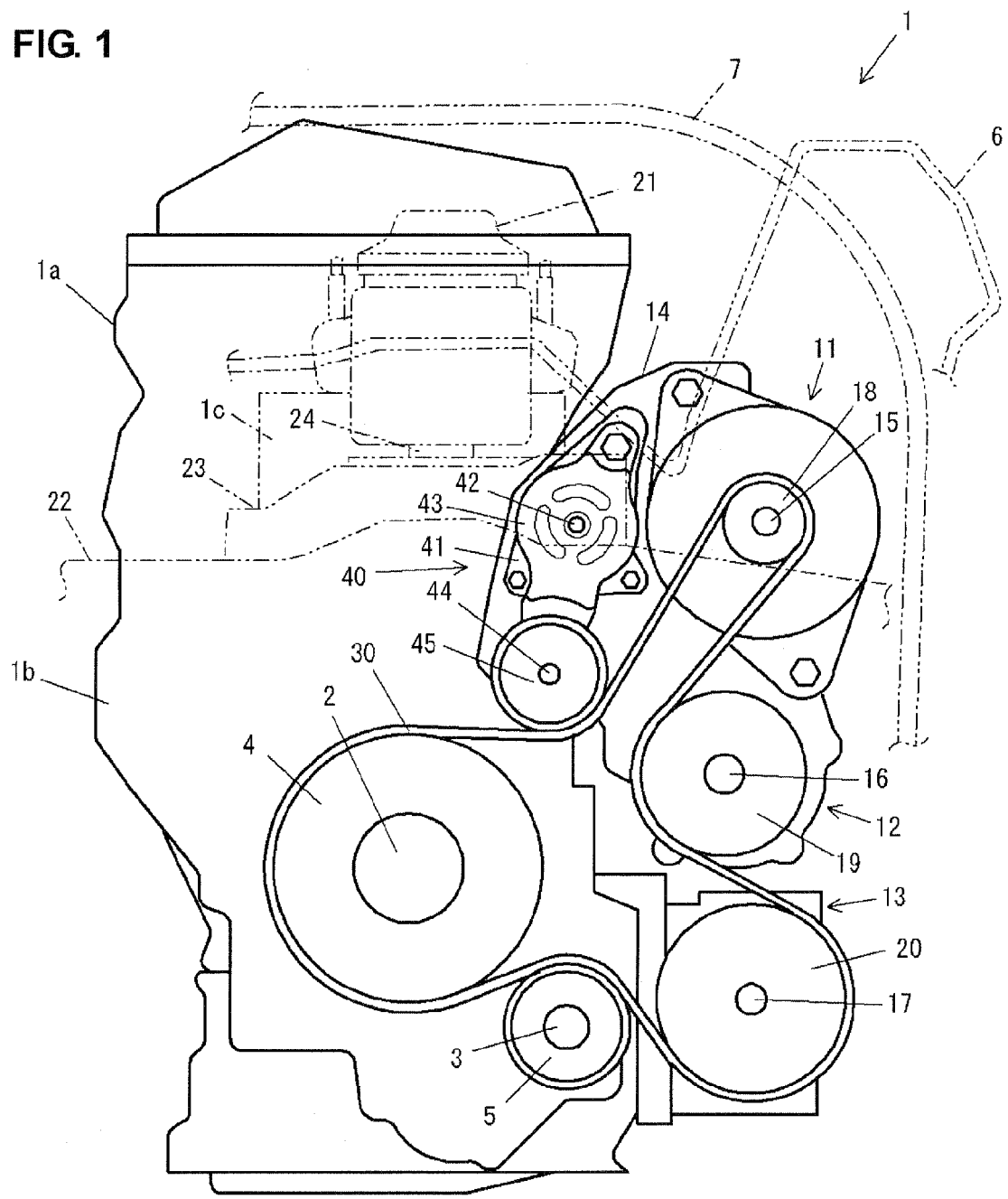
FIG. 1 is an elevation view of an engine according to an embodiment of the present invention.

FIG. 1 is an elevation view of an engine 1 equipped with a belt tensioner according to an embodiment. As shown in this figure, the engine 1 comprises a crankshaft 2 that projects from a front end face 1b of a body 1a and an idle shaft 3 located in parallel to the crankshaft 2. Pulleys 4, 5 are attached to tips of the shafts 2, 3, respectively.

Further, to the body 1a of the engine 1 are attached auxiliary components, such as an alternator 11, a water pump 12, a compressor 13 of air conditioner, via brackets or the like. The components 11, 12, 13 include axes 15, 16, 17 disposed in parallel to the crankshaft 2. Pulleys 18, 19, 20 are attached to one ends of these, respectively.

An endless belt 30 (hereinafter, referred to as "belt 30" simply) is disposed around the pulleys 4, 5, 18, 20 so that the respective auxiliary components 11, 12, 13 are driven by the crankshaft 2.

Figure 2:
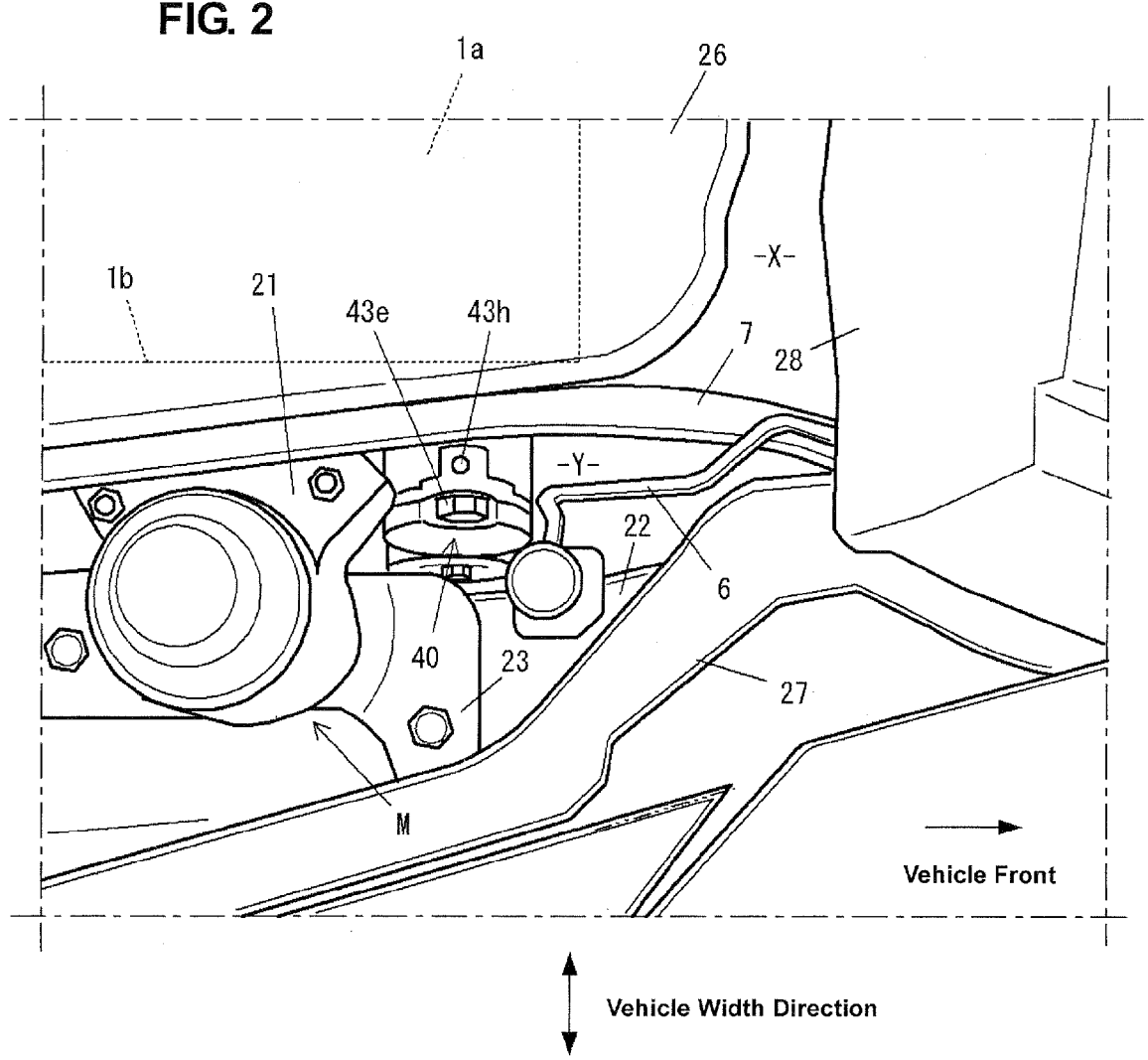
FIG. 2 is a plan view (seen from slightly obliquely above) of surroundings of an end face of the engine.

The engine 1 is disposed laterally in an engine room X at a vehicle front as shown in FIG. 2. A flat sound-insulation cover 26 is provided above the engine body 1a. A front frame 22 and a fender support member 27, which constitute a vehicle body, are provided on a side of the engine body 1a so as to extend longitudinally. A shroud panel 28 is provided in front of the engine body 1a.

The engine 1 is, as shown in FIGS. 1 and 2, supported at the vehicle body via a mount structure which includes an engine-side mount bracket 21 which is fixed to an engine-mount attaching base 1c provided at a front cover forming the front end face 1b, a vehicle-body-side mount bracket 23 which is attached to an upper face of the front frame 22, and a damper 24 which is disposed between the brackets 21, 23.

Further, a belt tensioner 40 which restrains the belt 30 from loosening is disposed in a narrow space Y formed between the front end face 1b and the vehicle-body-side mount bracket 23. In this space Y various components such as a fuel pipe 6 and a coolant pipe 7 of the engine 1 are disposed. According to the present embodiment, the belt tensioner 40 is provided in this space Y so that its belt exchanging is available.

Figure 3:
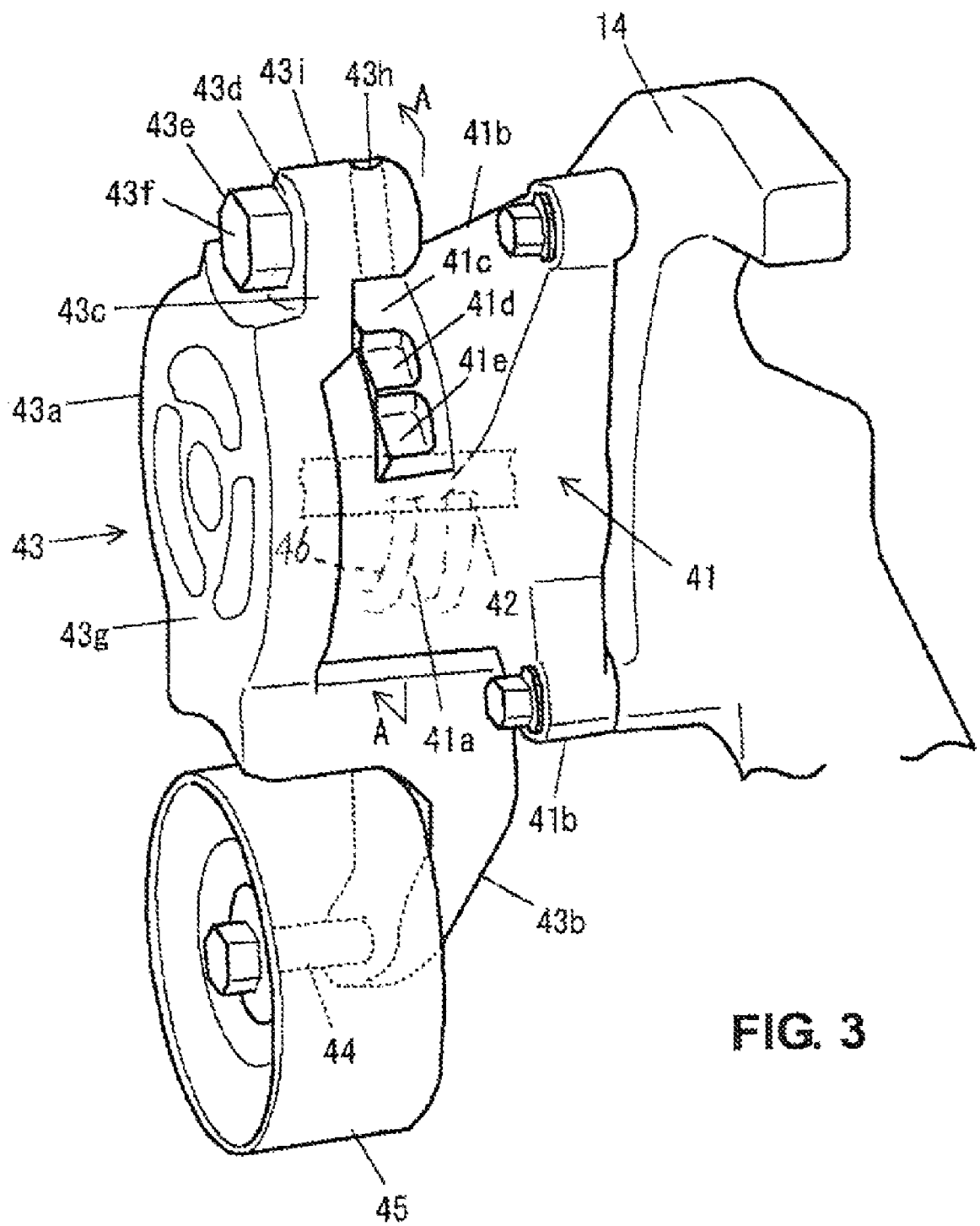
FIG. 3 is an enlarged perspective view of a belt tensioner.

That is, the belt tensioner 40, as shown in FIGS. 1 and 3, comprises a bearing case 41 which is attached to the front end face 1b of the engine body 1a via an auxiliary-component attaching bracket 14, a tensioner arm 43 which is supported rotatably at the bearing case 41 via an axis 42 located in parallel to the crankshaft 2 (engine output shaft), and a pulley 45 which is supported rotatably at a free end portion of the tensioner arm 43 via an axis 44 in located in parallel to the crankshaft 2.

The bearing case 41 comprises a cylindrical body portion 41a which has a bottom with an opening on a side opposite to the engine front end face 1b, and plural leg portions 41b . . . 41b which extend outward from the body portion 41a on the side of the engine front end face 1b and are fastened to the auxiliary-component attaching bracket 14.

The tensioner arm 43 includes a base end portion 43a which has a substantially circular shape and covers an opening of the body portion 41a of the bearing case 41 and an arm portion 43b which extends toward the engine body from a lower portion of the base end portion 43a first and then extends to downward. It is supported at the body portion 41a of the bearing case 41 so as to rotate around the support axis 42 which extends in parallel to the crankshaft 2 at almost the center of the base end portion 43a.

Further, a spring 46 (constituting a biasing mechanism: see FIG. 3) which bias the tensioner arm 43 toward the belt 30 is disposed in a space enclosed by the body portion 41a of the bearing case 41 and the base end portion 43a of the tensioner arm 43.

The tensioner arm 43 has an upper-extending portion 43c which extends upward from an upper portion of the base end portion 43a. A recessed portion 43d which is recessed toward the bearing case 41 is provided on the front face of the upper-extending portion 43c. On a counter engine-body side of the recessed portion 43d is formed a tool-engagement projection 43e which has a hexagonal-head-bolt shape and with which a wrench W (tensioner-arm rotation tool) can engage. Further, a face 43f of the tool-engagement projection 43e on a counter engine-body side is formed so as to retreat from a face 43g of the base end portion 43a of the tensioner arm 43 on the counter engine-body side.

The upper-extending portion 43c has a through hole 43h which extends substantially vertically and a jig-holding portion 43i which projects toward the engine body 1a on its engine-body side. The through hole 43h is to accept a bar jig B being inserted thereinto. A bolt or a round bar may be applied to the bar jig B.

Figure 4:
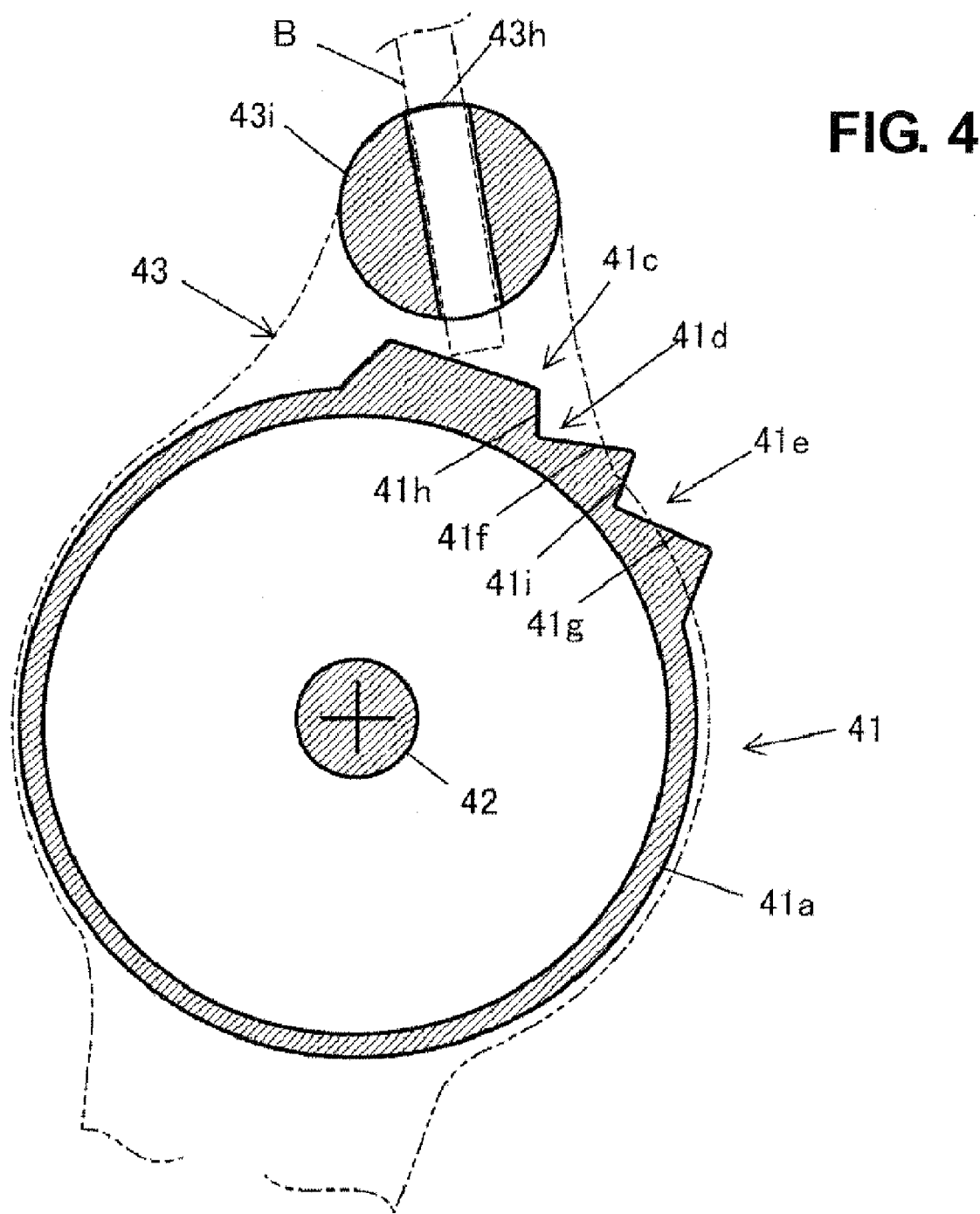
FIG. 4 is a sectional view taken along line A-A of FIG. 3.

As shown in FIG. 4 (which shows a state corresponding to FIG. 5), a lower opening of the through hole 43h faces a contact face portion 41c which is formed an outer peripheral face of the base portion 41a of the bearing case 41. A portion of the contact face portion 41c which faces the through hole 43h of the tensioner arm 43 is configured to be thicker than any other portion so as to accept a lower end portion of the bar jig B being inserted thereinto from above.

Herein, two stair portions 41d, 41e (engagement stair portions) are provided at the contact face portion 41c, which are located with a specified distance from each other in a rotational direction of the tensioner arm 43. The bar jig B is inserted into the through hole 43h so that its lower end face contacts a face 41f (41g) of the stair portion 41d (41e). Accordingly, despite the biasing force of the spring 46, the move of the tensioner arm 43 toward the belt 30 is restricted by the contact of the side face of the bar jig B with vertical face 41h (41i) of the stair portion 41d. Hereinafter, the stair portion 41d will be referred to as a middle stair portion 41d, while the stair portion 41e will be referred as a final stair portion 41e.

Next, the belt exchanging method with the belt tensioner 40 will be described. At first, a state in which the belt 30 has been removed will be described, then a state in which the belt 30 has not been removed will be described.

Figure 5:
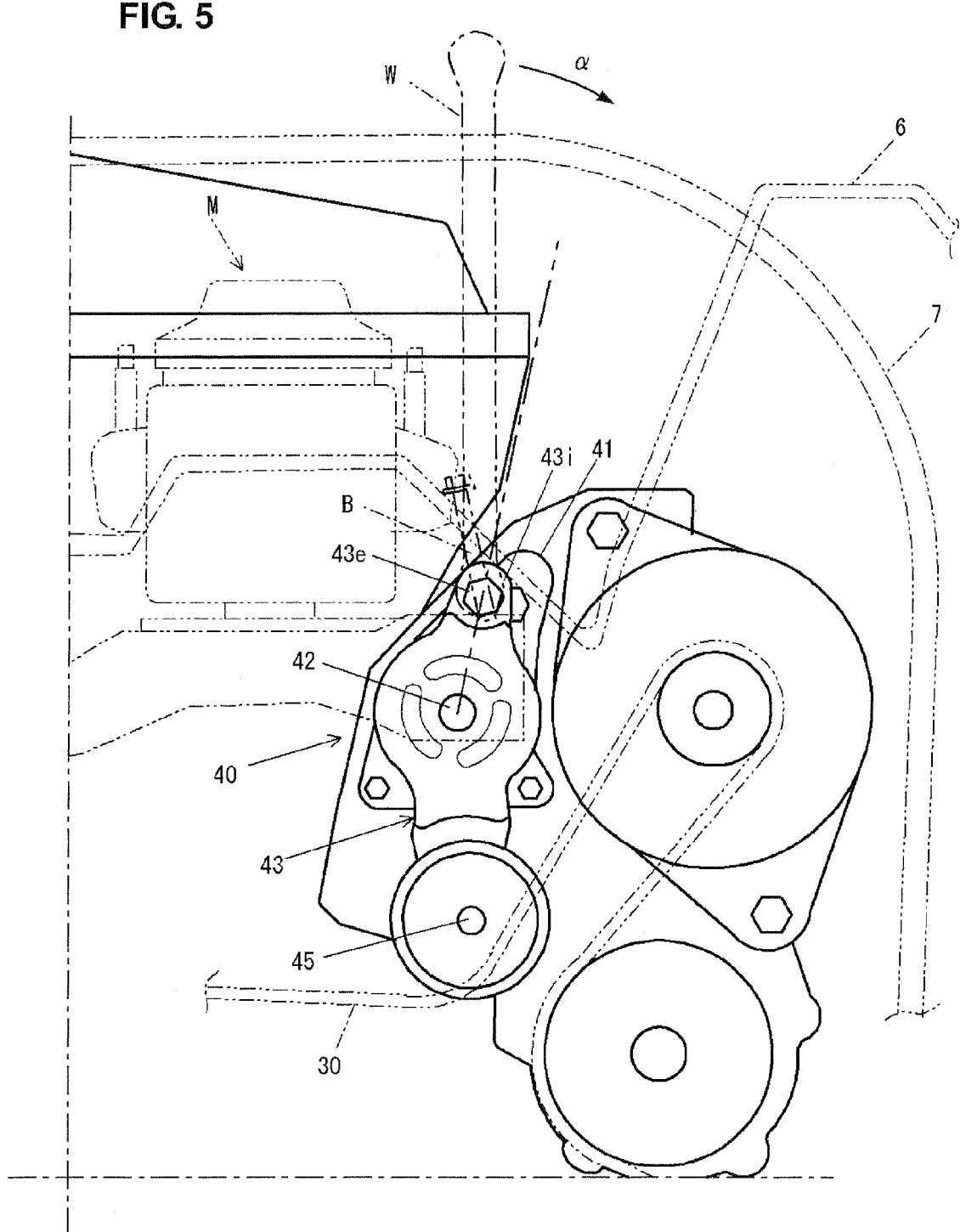
FIG. 5 is an enlarged view of surroundings of the belt tensioner to show operation (first aspect).

In the state in which the belt 30 has been removed, the tensioner arm 43 of the belt tensioner 40 is located by the biasing force of the spring 46 in the closest position to the belt 30 in an initial stage, as shown in FIG. 5. The pulley 45 has moved to a position beyond the belt position of the belt 30 disposed as illustrated by an imaginary line in the figure.

Figure 6:
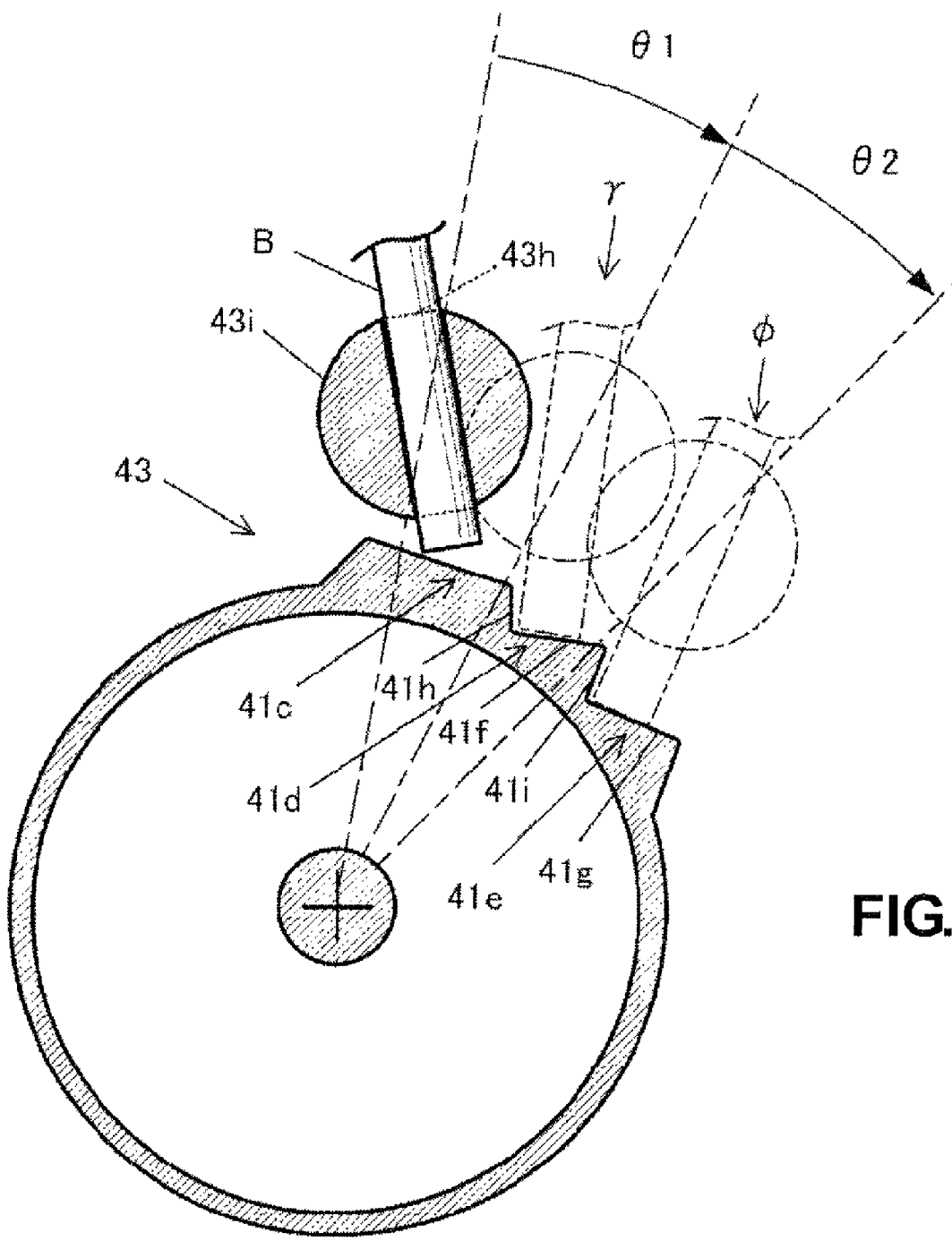
FIG. 6 is an enlarged view of the surroundings of the belt tensioner to show operation, which corresponds to FIG. 4.

Then, as shown in FIG. 6, the bar jig B is inserted into the through hole 43h of the jig-holding portion 43i from above so that its tip can contact the contact face portion 41c.

Subsequently, the wrench W is inserted from above so that the engagement portion of its tip can engage with the tool-engagement projection 43e of the tensioner arm 43. Herein, the wrench W which has a concave polygon (twelve-sided) at its side face can be used.

Then, the wrench W is rotated in a direction α in such a manner that the free end of the tensioner arm 43, i.e., the pulley 45, gets away from the belt 30. Herein, the tip of the bar jig B slides on the upper face of the contact face portion 43c. When the tip of the bar jig B has reached the middle stair portion 41d as shown by an arrow γ in FIG. 6 (with a rotation of an angle θ1), the bar jig B moves downward by a distance of one stair. Herein, when the wrench W had rotated to a position, which is illustrated by an arrow δ in FIG. 7, near the fuel pipe 6 and the coolant pipe 7, a further rotation of the wrench W would cause interference between the wrench W and these pipes 6, 7. Accordingly, it may be necessary that engagement of the wrench W is changed. Herein, the engagement change of the wrench W with a single angle allows the rotation of the wrench W by 30 degrees away from the pipes 6, 7 to a position illustrated by an arrow ε. In this state, since the tip of the bar jig B is located at the middle stair portion 43d, even if the wrench W is removed, the move of the tensioner arm 43 toward the belt 30 by the biasing force of the spring 46 can be restricted properly with the contact of the tip of the bar jig B with the vertical face 41h of the middle stair portion 41d.

Figure 8:
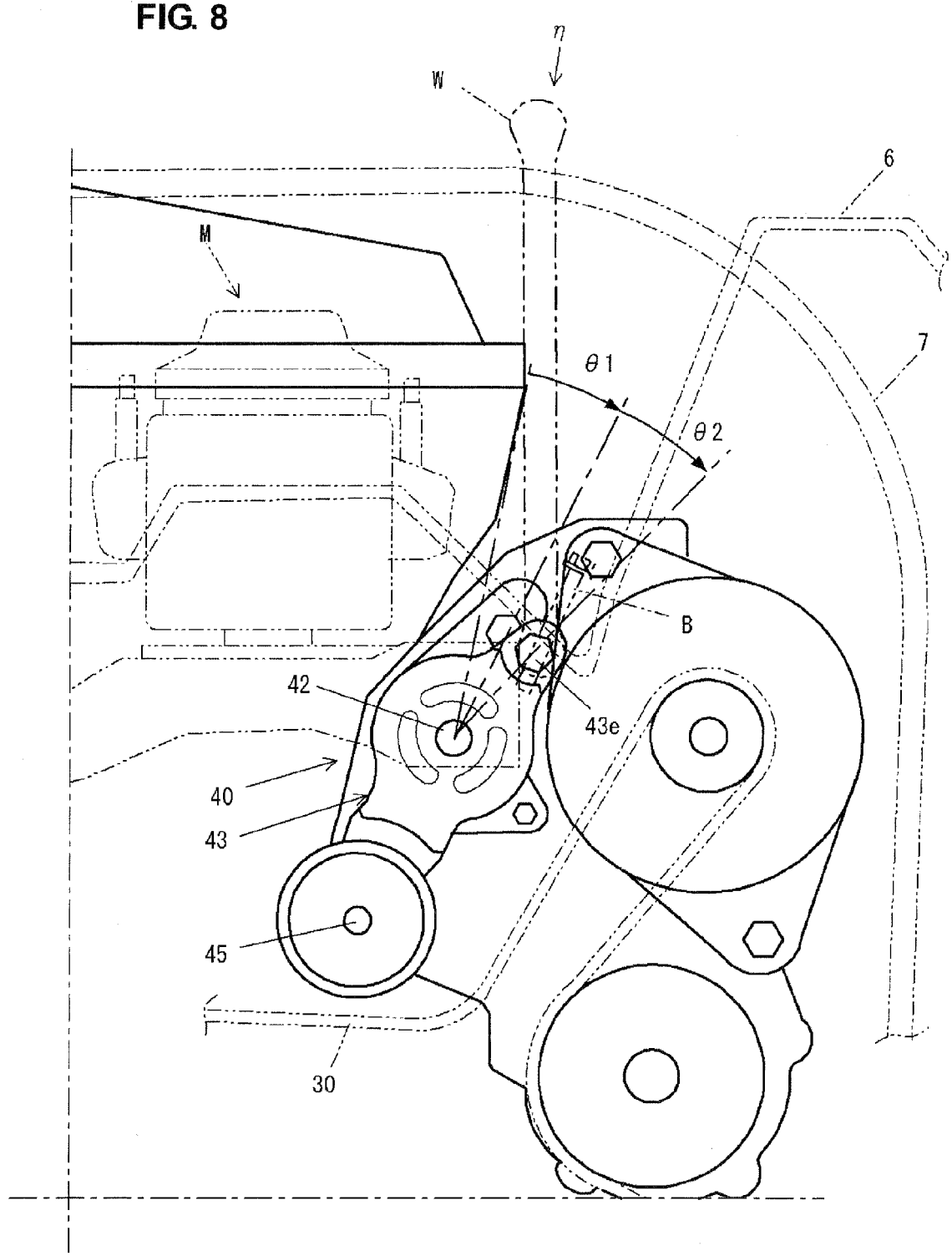
FIG. 8 is an enlarged view of the surroundings of the belt tensioner to show operation (third aspect).

Then, the wrench W is further rotated from the position with the arrow ε in the direction α so that the pulley 45 becomes further away from the belt 30. When the tip of the bar jig B has reached the final stair portion 41e as shown by an arrow φ in FIG. 6 (with a rotation of an angle θ2), the bar jig B moves downward by the distance of one stair. Thereby, the worker can recognize that the tensioner arm 43 has moved to a poison in which the belt exchanging is available, which is shown in FIG. 8. Herein, although the wrench W has been rotated to a position illustrated by an arrow η in FIG. 8, it is enough away from the pipes 6, 7 and the engine mount M.

In this state, since the tip of the bar jig B is located in the final stair portion 41e, the move (rotation) of the tensioner arm 43 toward the belt 30 by the biasing force of the spring 46 can be restricted properly with the contact of the tip of the bar jig B with the vertical face 41i of the final stair portion 41e.

In this state when the rotation of the tensioner arm 43 is restricted, an attachment of the belt is conducted. Accordingly, there may be no need of holding the wrench W with a hand of the worker. Herein, since various components are disposed around the belt tensioner 40, the belt attachment may be conducted from below.

Then, after the belt attachment, by rotating the wrench W slightly in the direction α to release the engagement of the bar jig B with the stair portion 41e and by removing the bar jig B from the jig-holding portion 43i, the tensioner arm 43 is rotated toward the belt 30 by the biasing force of the spring 46, so that the pulley 45 is pressed against the belt 30. Thereby, the belt 30 can be restrained from loosening.

This belt exchanging method may be applied to a new vehicle assembling case in which the belt is attached newly to the engine equipped with the auxiliary components.

Next, another case in which the belt has not been removed yet will be described. The following descriptions will be focused on differences from the previous case in which the belt has been already removed.

Figure 7:
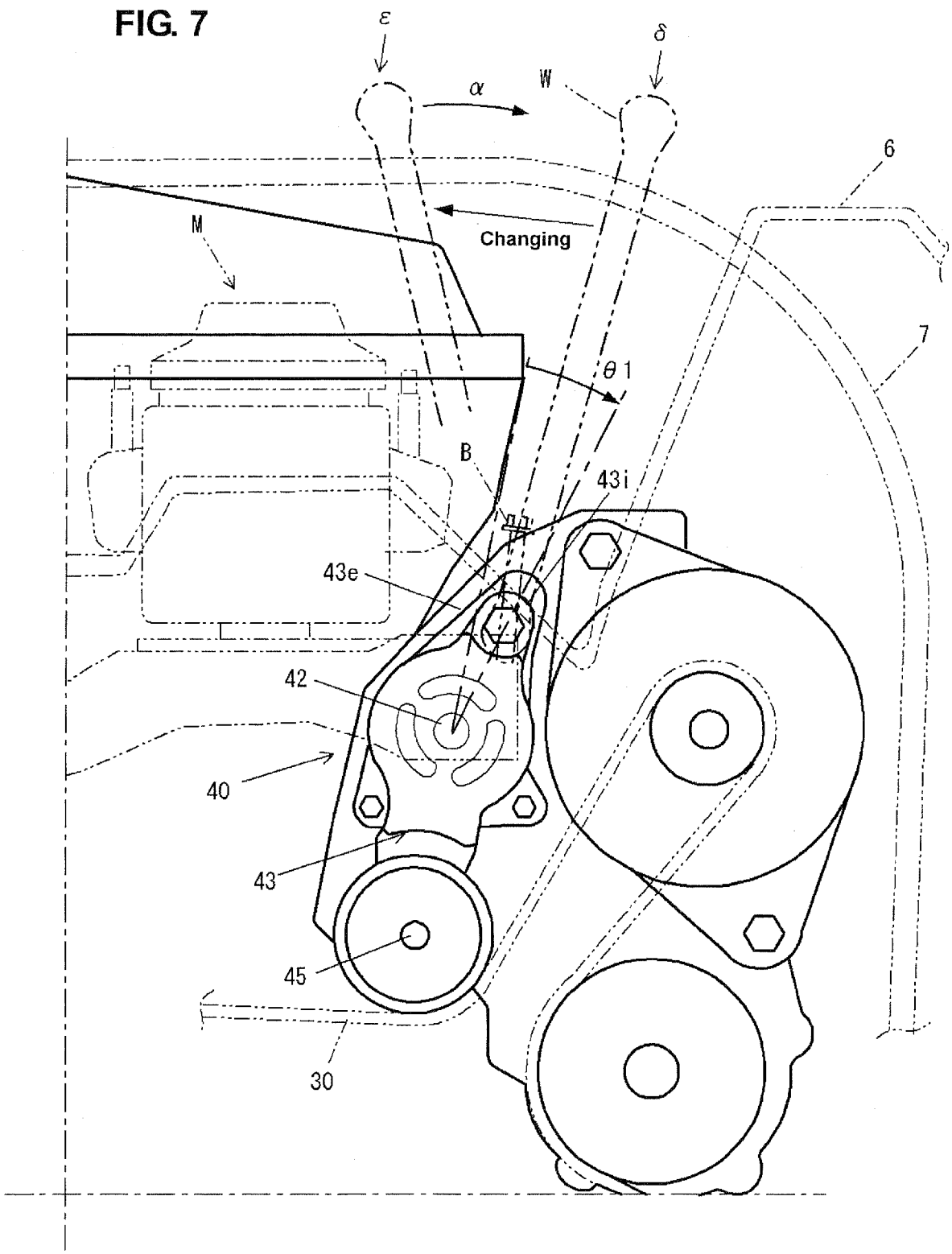
FIG. 7 is an enlarged view of the surroundings of the belt tensioner to show operation (second aspect).

In this case the tensioner arm 43 of the belt tensioner 40 is located at the position shown in FIG. 7. Accordingly, when the bar jig B is inserted into the through holes 43 of the jig-holding portion 43i, it comes to engage with the middle stair portion 41d as shown by the arrow γ in FIG. 6. Then, the wrench W is made engage with the tool-engagement projection 43e, and the tensioner arm 43 is rotated in the direction α. Accordingly, the bar jig B comes to engage with the final stair portion 41e as shown by the arrow φ in FIG. 6.

Herein, as long as the bar jig B remains inserted, the rotation of the tensioner arm 43 by the biasing force of the spring can be prevented even if the wrench W has been removed. Thus, the belt exchanging can be conducted by replacing the belt 30 with a new one.

As describe above, according to the present embodiment, an easy belt exchanging even by a single worker without detaching surrounding components of the engine is enabled.

Further, since the wrench W and the bar jig being B are inserted downward from above, there may be no need to detach the various devices which have been already attached in front of the end face 1b of the engine 1.

Also, since the bearing case 41 and the tensioner arm 43 have merely the tool-engagement projection 43e and the jig-holding portion 43i, the structure of the belt tensioner itself 40 can be made properly simple. Thus, the cost of the belt tensioner 40 may be kept properly low.

Further, since the two stair portions, the middle stair portion 41d and the final stair portion 41e, are located with the specified distance from each other in the rotational direction of the tensioner arm 43, the tensioner arm 43 can be held temporarily with the middle stair portion 41d, and in this state the engagement of the wrench W can be changed. Accordingly, even if the working space for operating the wrench W was narrow, the tensioner arm 43 could be rotated greatly.

Also, since the tool-engagement projection 43e of the tensioner arm 43 is provided so as to retreat from the face 43g on the counter engine-body side of the tensioner aim 43, it can be prevented from interfering with other components and the like in the engine room X at the operation of the wrench W.

Further, since the tool-engagement projection 43e and the jig-holding portion 43i of the tensioner arm 43 are provided at the upper end portion of the tensioner arm 43, when the wrench W is made engage with the bar jig B and the wrench W is inserted from above, respective distances to the tool-engagement projection 43e and the jig-engagement portion 43i are properly short, so that the operation for engagement and insertion can be easier.

Also, the engine body 1a is disposed laterally in the engine room X of the vehicle, and the end face 1b of which is supported at the vehicle body via the mount members 21, 23, 24 and the belt tensioner 40 is disposed between the end face 1b of the engine body 1a and the mount bracket 23. In this case, the space for operating the tensioner arm 43 would become considerably small. Herein, the advantages of the present invention can be properly achieved.

Herein, the present invention should be effective in the following embodiments as well, not limited to the above-described embodiment. One embodiment is that the tool-engagement portion is provided at the base end portion of the tensioner arm, and the wrench engagement projection functions as a bolt head for attaching the tensioner arm to its axis as well. Another one is that the tool-engagement portion functions as a bolt head for supporting the pulley.

The present invention can be applied widely to the belt tensioner of the engine.

What is claimed is:

1. A belt tensioner, comprising:
a bearing case attached to an end face of an engine body;
a tensioner arm, a base end portion of which is supported rotatably at the bearing case via an axis in parallel to an engine output shaft;
a pulley supported rotatably at a free end portion of the tensioner arm via an axis in parallel to the engine output shaft; and
a biasing mechanism provided between the bearing case and the tensioner arm so as to bias the tensioner arm toward a belt,
wherein the tensioner arm comprises a tool-engagement portion for engaging with a tensioner-arm rotation tool, and a jig-holding portion which has a through hole for accepting a tensioner-arm fixation bar jig inserted thereinto from above at a portion of the tensioner arm extending upward from the base end portion, and
the bearing case comprises a contact face portion which is provided at a face located below the jig-holding portion of the bearing case so as to accept the bar jig inserted into the through hole of the tensioner arm, and an engagement stair portion which is provided at the contact face portion so as to engage with the bar jig such that a move of the tensioner arm toward the belt by the biasing mechanism is restricted.

2. The belt tensioner of claim 1, wherein the tool-engagement portion of said tensioner arm is provided at the portion of the tensioner arm extending upward from the base end portion so as to project in a direction of a rotational axis of the tensioner arm.

3. The belt tensioner of claim 2, wherein said engagement stair portion comprises two stair portions which are located with a specified distance from each other in a rotational direction of the tensioner arm.

4. The belt tensioner of claim 1, wherein the tool-engagement portion of said tensioner arm is provided at the portion of the tensioner arm extending upward from the base end portion so as to project toward a counter engine-body side in a direction of a rotational axis of the tensioner arm, the tool-engagement portion is provided so as to retreat from a face of the tensioner arm on a counter engine-body side.

5. The belt tensioner of claim 1, wherein the tool-engagement portion and the jig-holding portion of said tensioner arm are provided at an upper end portion of the tensioner arm.

6. The belt tensioner of claim 1, wherein the engine body is disposed laterally in an engine room of a vehicle, an end face of which is supported at a vehicle body via a mount member, and the belt tensioner is disposed between the end face of the engine body and the mount member.

7. A belt exchanging method of a belt tensioner which comprising a bearing case attached to an end face of an engine body, a tensioner arm, a base end portion of which is supported rotatably at the bearing case via an axis in parallel to an engine output shaft, a pulley supported rotatably at a free end portion of the tensioner arm via an axis in parallel to the engine output shaft, and a biasing mechanism provided between the bearing case and the tensioner arm so as to bias the tensioner arm toward a belt, the method comprising:
a step of making a tensioner-arm fixation bar jig come into a through hole of a jig-holding portion which is formed at a portion of the tensioner arm extending upward from a base end portion of the tensioner arm such that a contact face portion provided at a face located below the jig-holding portion of the bearing case accepts the tensioner-arm fixation bar jig being inserted into the through hole;
a step of making a tensioner-arm rotation tool engage with a tool-engagement portion which is formed at the tensioner arm; and
a step of making the tensioner-arm rotation tool rotate against a biasing force of the biasing mechanism after the said steps such that the bar jig engages with an engagement stair portion which is formed at the contact face portion of the bearing case, thereby restricting a move of the tensioner arm toward the belt by the biasing mechanism.

* * * * *